United States Patent [19]
Odashima

[11] Patent Number: 5,534,206
[45] Date of Patent: Jul. 9, 1996

[54] METHOD FOR PREPARING BAKED PENCIL LEADS USING CONCENTRIC STRAIGHTENING PLATES

[75] Inventor: Hideo Odashima, Gunma, Japan

[73] Assignee: Mitsubishi Pencil Kabushiki Kaisha, Tokyo, Japan

[21] Appl. No.: 385,967

[22] Filed: Feb. 9, 1995

Related U.S. Application Data

[62] Division of Ser. No. 118,030, Sep. 8, 1993, Pat. No. 5,430,075.

[30] Foreign Application Priority Data

Sep. 25, 1992 [JP] Japan .................................... 4-256307
May 25, 1993 [JP] Japan .................................... 5-122611

[51] Int. Cl.$^6$ .................................................. B29C 47/70
[52] U.S. Cl. .......................... 264/108; 264/49; 264/211.11
[58] Field of Search ..................................... 425/466, 114; 264/108, 49, 211.11

[56] References Cited

U.S. PATENT DOCUMENTS

| | | | |
|---|---|---|---|
| 1,911,858 | 5/1933 | Trebes | 425/113 |
| 1,978,163 | 10/1934 | Megow | 264/105 |
| 2,790,202 | 4/1957 | Lorenian | 264/172 |
| 2,988,784 | 6/1961 | Lorenian | 264/172 |
| 3,168,509 | 2/1965 | Juel | 264/108 |
| 3,254,143 | 5/1966 | Heitman | 264/105 |
| 3,350,485 | 10/1967 | Shesler et al. | 264/105 |
| 3,447,203 | 6/1969 | Campbell | 425/466 |
| 3,791,504 | 2/1974 | Wiser et al. | 198/419.1 |
| 4,826,422 | 5/1989 | Hunter | 425/461 |
| 4,853,167 | 8/1989 | Bard et al. | 264/122 |

FOREIGN PATENT DOCUMENTS

| | | | |
|---|---|---|---|
| 1278587 | 11/1989 | Japan | 264/211.11 |
| 4-272971 | 9/1992 | Japan . | |

*Primary Examiner*—Allan Kuhns
*Attorney, Agent, or Firm*—Darby & Darby

[57] ABSTRACT

Baked pencil leads in which a filler such as flaky graphite is oriented in a concentric tubular form in an outer peripheral portion of each lead and which has one or more layers spaced in a radial direction from the outer peripheral portion and comprising the filler oriented in the concentric tubular form between the central portion and the outer peripheral portion of each lead and in which the filler is at random or radially oriented in the other portions of each lead. The baked pencil leads can be obtained by the use of a plurality of concentric conical tubular straightening plates having the sectional area of a flow path continuously decreased toward a nozzle orifice, in extruding a kneaded material mainly comprising the filler and a binder. In the baked pencil leads, strength can be remarkably improved without lowering density, and thus these baked pencil leads are excellent in the balance between the strength and the density.

4 Claims, 5 Drawing Sheets

METHOD FOR PREPARING BAKED PENCIL LEADS USING CONCENTRIC STRAIGHTENING PLATES

This is a division of application Ser. No. 08/118,030, filed Sep. 8, 1993, now U.S. Pat. No. 5,430,075.

BACKGROUND OF THE INVENTION (i) Field of the Invention

The present invention relates to wood-cased pencil leads and pencil leads for mechanical pencils.

More specifically, it relates to baked pencil leads having high strength as well as holding high density and smooth writing performance which are usually contrary to the improvement of the strength, and a method for preparing the baked pencil leads.

(ii) Description of the Prior Art

Conventional wood-cased pencil leads and pencil leads for mechanical pencils are manufactured by adding a binder such as clay, a natural polymer, a synthetic polymer, a pitch or an asphalt to a coloring agent such as graphite or carbon black, further adding a suitable solvent and plasticizer if necessary, kneading them, extruding the kneaded material into a linear shape, baking the extruded articles at a temperature of from 900° to 1,200° C., and then impregnating pores in the baked articles with an oil.

It is known that even in the conventional pencil leads, a filler such as flaky graphite is oriented in a tubular form in an outer peripheral portion of each lead owing to high shear stress caused by a die at the time of extrusion to heighten the strength of the lead. However, of the conventional baked pencil leads, particularly thin leads for mechanical pencils are poor in strength, and therefore their strength has not reached a practical level, depending upon the hardness of the leads.

In order to improve the strength of the leads, various techniques have been suggested, but usually when the strength of the leads is improved, their density lowers and writing performance also tends to deteriorate. Conversely, if the writing performance is improved, the strength is liable to decline. Hence, there has not been any fundamental solution of this problem.

Figure 4:
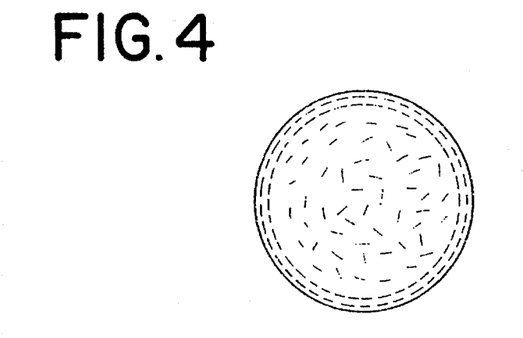
FIG. 4 is a schematic view illustrating a sectional structure of a conventional lead in which the concentric tubular orientation is present only in the outer peripheral portion of the lead.

FIG. 4 shows a cross-sectional matrix structure of the usual lead for the mechanical pencils particularly by exhibiting a distribution of graphite constituting flaky crystals. As shown in this drawing, in a skin layer (a surface layer portion) of the outer peripheral portion of the lead, a filler such as the flaky graphite is oriented in a concentric tubular form along the outer periphery, but in the internal matrix structure of the lead, the filler is oriented at random as a cluster of bees in a beehive.

Thus, much attention is paid to such a cross-sectional structure of the lead, and various techniques for improving this structure have been suggested.

In Japanese Patent Publication No. 33957/1987, it is disclosed that a material is extruded into a star-shaped profile linear form having a rough outer periphery through a first step nozzle, and this profile linear article is further extruded into a linear form having a predetermined diameter. This technique is still poor to orient the filler even in the internal portion of each lead.

Japanese Patent Publication No. 36880/1987 discloses that a material is extruded into a plurality of thin lines through a first step nozzle, and a group of these thin lines is then extruded into a linear form having a predetermined diameter.

This technique also intends to spread the orientation of the filler along the outer peripheral portion of the conventional pencil lead to the internal portion, but in fact, the initial orientation is disordered by the second step nozzle. Even if the initial orientation is maintained, the filler is oriented in a radial direction on half sides of the plural thin lines.

Japanese Patent Application Laid-open No. 139274/1992 discloses pencil leads in which a filler is oriented radially from the central portion to the outer peripheral portion of each lead in the cross-sectional view of the lead. This technique intends to increase the density of lines by a plotter or the like for drawing vertical lines, but since the filler is radially parallelly oriented on the whole, cracks easily occur along the parallel orientation of the filler by shrinkage stress extending from the outer peripheral portion to the central portion of each lead which is caused in a heat treatment step.

SUMMARY OF THE INVENTION

An object of the present invention is to provide pencil leads each having an outer peripheral portion in which a filler is oriented in a concentric tubular form, an internal portion which is constituted as if at least one other lead having such an outer peripheral portion is concentrically buried in the internal portion, and other portions in which the filler is oriented at random or radially. Furthermore, in this kind of pencil leads, bending strength is remarkably improved without lowering density, and so they are excellent in the balance between the strength and the density.

The first aspect of the present invention is directed to baked pencil leads in which a filler such as flaky graphite is oriented in a concentric tubular form in an outer peripheral portion of each lead and which has one or more layers spaced in a radial direction from the outer peripheral portion and comprising the filler oriented in the concentric tubular form between the central portion and the outer peripheral portion of each lead and in which the filler is at random or radially oriented in the other portions of each lead.

The second aspect of the present invention is directed to a method for preparing baked pencil leads which comprises the steps of blending a filler and a binder as the main materials with pore generating materials, kneading them, extruding the kneaded material, and then subjecting the extruded articles to a heat treatment at a high temperature, said method being characterized in that a plurality of concentric conical tubular straightening plates having the sectional area of a flow path continuously decreased toward a nozzle orifice are provided on the upstream side of an extrusion nozzle, and the extrusion is carried out through the straightening plates and the extrusion nozzle.

The third aspect of the present invention is directed to the baked pencil leads described in the paragraph (1) wherein the filler is at least one selected from the group consisting of natural graphite, artificial graphite, Kish graphite, carbon black, coke powder, mica, talc and boron nitride.

The fourth aspect of the present invention is directed to the baked pencil leads described in the paragraph (1) wherein the average particle diameter of the filler is in the range of from 1 μm to 50 μm.

The fifth aspect of the present invention is directed to the method for preparing baked pencil leads described in the paragraph (2) wherein the filler is at least one selected from the group consisting of natural graphite, artificial graphite, Kish graphite, carbon black, coke powder, mica, talc and boron nitride.

The sixth aspect of the present invention is directed to the method for preparing baked pencil leads described in the paragraph (2) wherein the average particle diameter of the filler is in the range of from 1 µm to 50 µm.

The seventh aspect of the present invention is directed to the method for preparing baked pencil leads described in the paragraph (2) wherein the binder is at least one selected from the group consisting of kaolinite, halloysite, montmorillonite, bentonite, vinyl chloride resin, chlorinated vinyl chloride resin, polyvinyl alcohol, furan resin, phenolic resin, epoxy resin, lignin, cellulose, tragacanth gum, petroleum asphalt, coal tar pitch, pitch formed at the decomposition of a naphtha, and pitch formed at the dry distillation of a synthetic resin.

DETAILED DESCRIPTION OF THE INVENTION

By the present inventors, a plurality of concentric conical tubular straightening plates having the sectional area of a flow path continuously decreased toward a nozzle orifice were disposed on the upstream side of an extrusion nozzle, and a kneaded material of a filler and a binder as the main materials was extruded into lead articles. After baking of the lead articles, a cross-sectional structure of each lead article was inspected, and as a result, a tubular structure was observed in the internal portion of the lead. Hence, on Sep. 25, 1992, a patent application was filed with regard to pencil leads in which a filler was oriented in a concentric tubular form between the central portion and the outer peripheral portion of the lead.

On Sep. 29, 1992, Japanese Patent Application Laid-open No. 272971/1992 was published, and in this publication, there were disclosed pencil leads having the concentric orientation of a filler in a cross-sectional view. A method for preparing these pencil leads comprises the step of carrying out extrusion through a die in which a cone having radial grooves in a side wall and a through-hole in a central portion is arranged in a tapered orifice of a nozzle so that the top of the cone may be positioned on an extrusion side.

The preparation methods of these inventions are clearly different from each other, but the obtained leads have the similar cross-sectional structure. The present inventors have carried out follow-up tests to inspect them in detail. As a result, they have found that when the apparatus of the present invention in which the plurality of concentric conical tubular straightening plates are disposed on the upstream side of the nozzle orifice is used, there can be obtained a lead which is constituted as if one or more leads having a concentric tubular filler orientation are buried in the internal portion of the conventional lead having the similar concentric tubular filler orientation in its outer peripheral portion and in which the filler is oriented at random or radially between the outer peripheral layer and the internal filler orientation, the number of the buried leads having the concentric tubular filler orientation depending upon that of the straightening plates.

Figure 12:
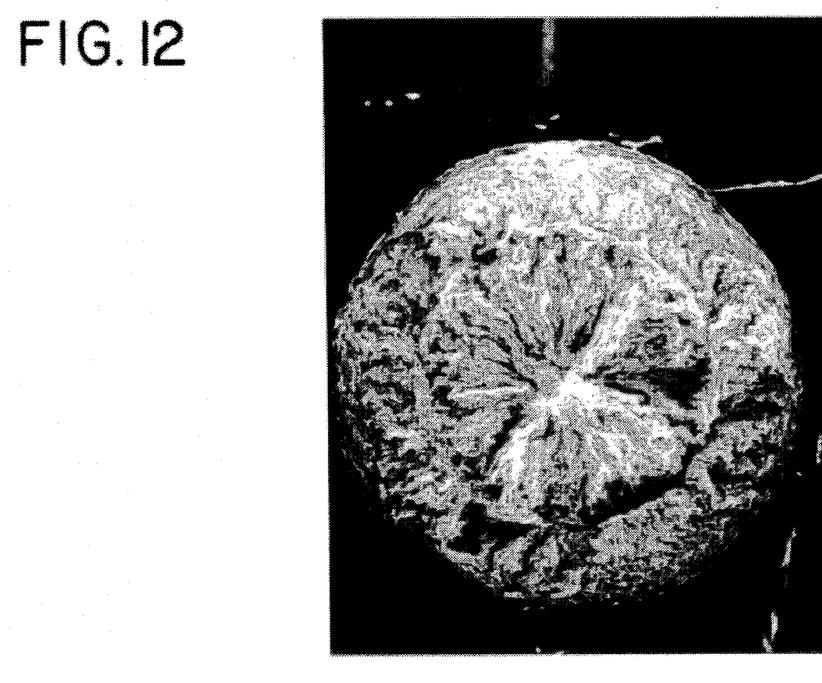
FIG. 12 is a photo micrograph of a cross-sectional graphite crystalline distribution structure of one example of the pencil lead of the present invention.

A micrograph of a cross-sectional structure of this lead is shown in FIG. 12.

Figure 13:
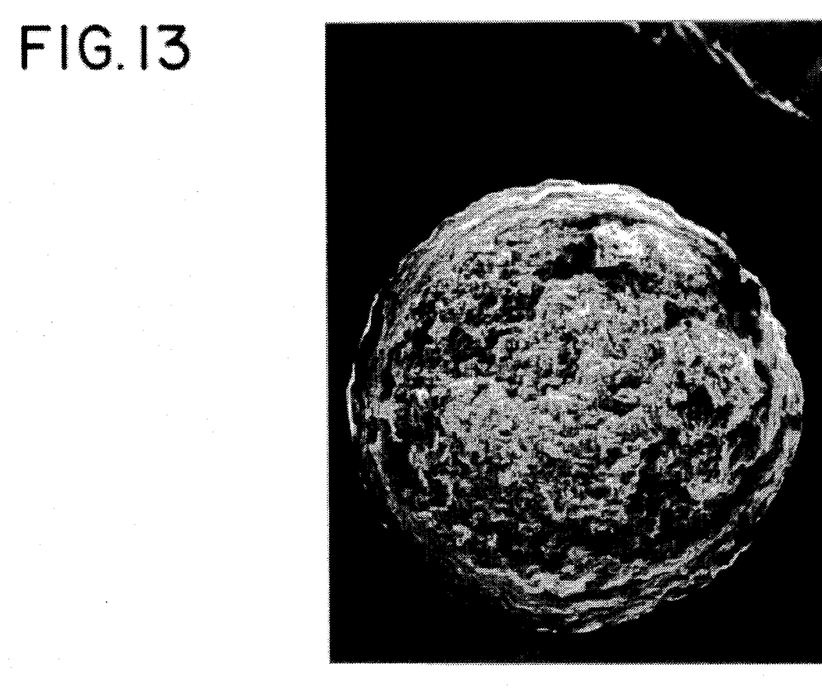
FIG. 13 is a photo micrograph of a cross-sectional graphite crystalline distribution structure of a pencil lead which has been obtained by an apparatus disclosed in Japanese Patent Application Laid-open No. 272971/1992 in which a cone having radial grooves in a side wall and a through-hole in a central portion is arranged in a tapered orifice of a nozzle.

On the contrary, when the device of Japanese Patent Application Laid-open No. 272971/1992 is used, a thick concentric structure of the obtained pencil lead is clearly observed in its outer peripheral portion, but its internal portion has an intricate structure in which the orientation of a filler is neither concentric nor radial. A micrograph of a cross-sectional structure of the pencil lead is shown in FIG. 13. According to this micrograph, the lead of this publication does not have a complete concentric tubular structure. In the thick concentric structure in the outer peripheral portion, the denseness of the filler is excessively high, and so the lead is less worn at the time of writing and a density is insufficient, though strength can be improved.

On the contrary, when the device of the present invention is used, the filler is oriented at random or radially between a plurality of tubular orientations, which permits providing the pencil lead having an excellent balance between the strength and the density.

That is, the features of the present invention are as described in Summary of the Invention.

It is known that the bending strength of a lead is higher in the outer peripheral skin layer than in the internal portion of the lead, but this is attributed to the fact that the orientation of the filler in the outer peripheral portion is enhanced by high shear stress with a die wall at the time of the extrusion of the lead.

From the inspection of the present inventors, it has been found that for example, in the case of a lead having a hardness of HB, a nominal diameter of 0.5 mm and a bending strength of 370 MPa, the skin layer has an extremely high strength of 1,000 MPa.

Figure 1:
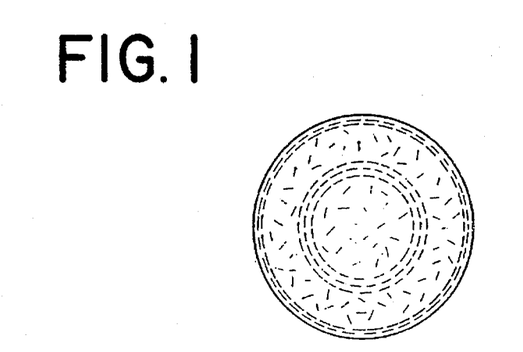
FIG. 1 is a schematic view illustrating a sectional structure of a lead of the present invention, and this schematic view shows a concentric tubular orientation of a filler in an outer peripheral portion of the lead, another concentric tubular orientation of the filler in the internal portion of the lead, and a random orientation of the filler in the other portions of the lead.
Figure 2:
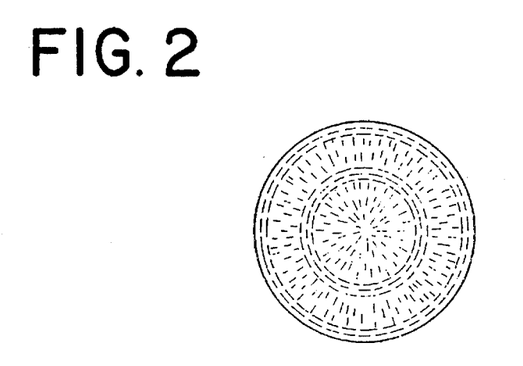
FIG. 2 is a schematic view illustrating another sectional structure of a lead of the present invention, and this schematic view shows the distribution of the filler radially oriented from the center of the lead in the portions other than the two portions having the concentric tubular orientation.
Figure 3:
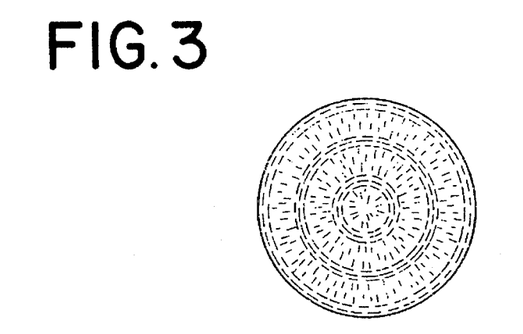
FIG. 3 is a schematic view illustrating still another sectional structure of a lead of the present invention, and this schematic view shows the three concentric tubular orientations of the filler and the distribution of the filler radially oriented from the center of the lead in the other portions.

In view of the above-mentioned fact, the present inventors have conducted the following investigation. In order to form such a concentric tubular structure as in the outer periphery skin layer in the internal portion of the lead, extrusion was made by the use of an extruder having a plurality of concentric conical tubular straightening plates on the upstream of a nozzle orifice. In this case, a lead could not be obtained in which the filler was oriented in the whole range of from the central portion to the peripheral portion of the lead. However, as shown in FIGS. 1, 2 and 3, in the outer peripheral portion of the lead, a filler such as graphite is oriented in a concentric tubular form, and in the internal portion, one or more layers spaced in a radial direction from the outer peripheral portion and comprising the filler oriented in the concentric tubular form are formed. In other words, the internal portion is constituted as if another lead having a concentric tubular filler orientation is buried within the lead having the outer peripheral akin layer. The number of the layers depends upon the number of the straightening plates and the viscosity of the kneaded material.

In this spaced inside portion, the filler is oriented radially or at random, which contributes to the increase of the density, and the orientation of the filler in the internal structure contributes to the increase of a reinforcement effect. Hence, this constitution permits providing a pencil lead having the remarkably improved strength and the excellent balance between the strength and the density.

Reference will be made to a process for obtaining a plurality of concentric tubular filler orientation structure spaced in the radial direction from the outer peripheral portion.

A binder such as clay, a natural polymer, a synthetic polymer, a pitch or an asphalt is added to a coloring agent (which is simultaneously, filler) such as graphite or carbon black, and if necessary, a suitable solvent and/or a plasticizer is added thereto and they are then kneaded. The kneaded material is extruded by the use of an extrusion die having a plurality of concentric conical tubular straightening plates in which the sectional area of a flow path continuously decreases toward a nozzle orifice, as shown in FIGS. 5 and 6, the plates being disposed on the upstream side of an extrusion nozzle (FIG. 5 is a cross-sectional view, and FIG. 6 is a side view).

When the kneaded material is separately passed through the straightening plates, a filler such as graphite contained in the kneaded material is highly oriented in an extrusion direction by high shear stress with the wall surfaces of the straightening plates. In addition, when the kneaded material is separately passed through the tapered portions and the streams of the kneaded material are jointed, the portions of the kneaded material which come in contact with the wall surfaces of the straightening plates form layers in which the filler is highly oriented in a concentric tubular form, and the other portions of the internal structure are constituted at random as a cluster of bees in a beehive, as shown in FIG. 1, or it takes a structure in which the filler is radially oriented, as shown in FIG. 2.

Figure 5:
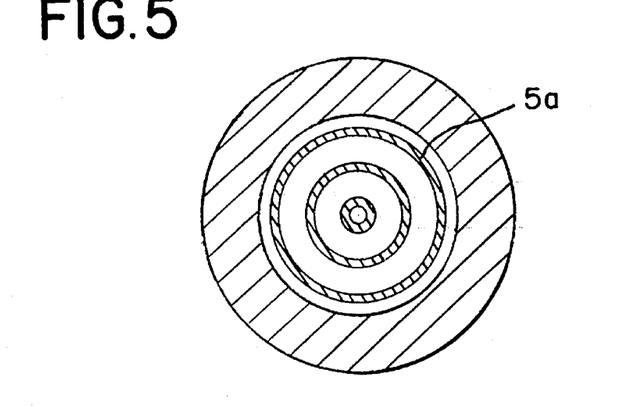
FIG. 5 is a horizontally sectional view of straightening plates arranged on the upstream side of a nozzle opening at the time of the extrusion of the pencil lead of the present invention.
Figure 6:
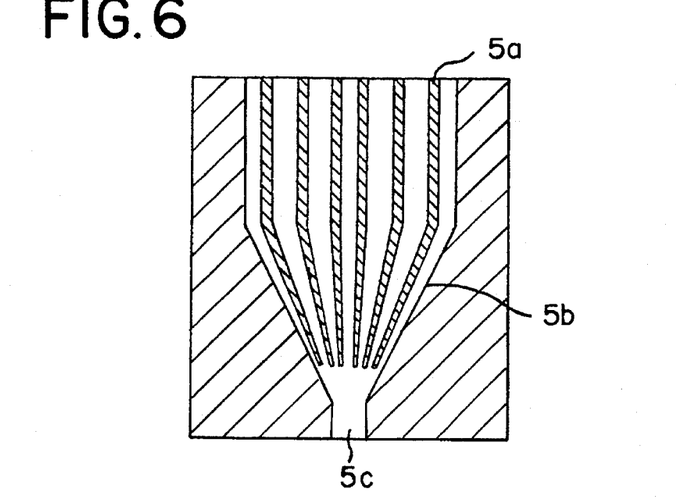
FIG. 6 is a vertical-sectional view of the extrusion die shown in FIG. 5 along its central line.
Figure 7:
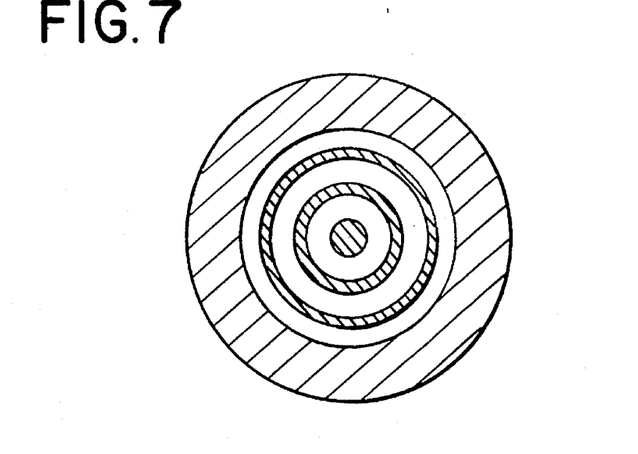
FIG. 7 is a horizontally sectional view of straightening plates having no central orifice which are variants of the straightening plates shown in FIG. 5.
Figure 9:
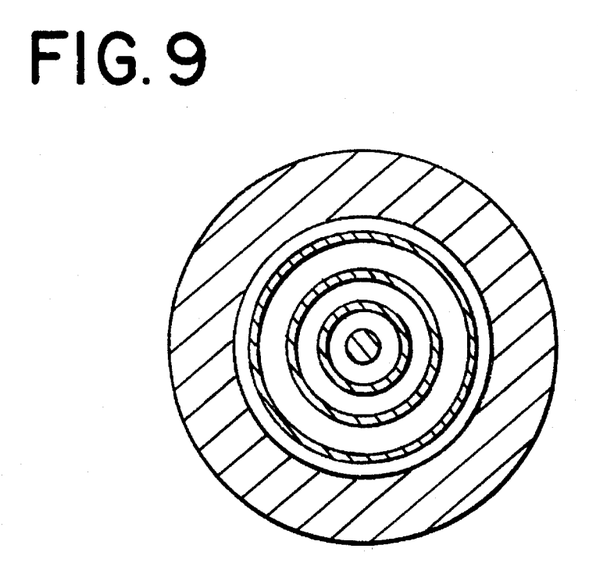
FIG. 9 is a horizontally sectional view of the die having an increased number of the straightening plates shown in FIG. 7.
Figure 10:
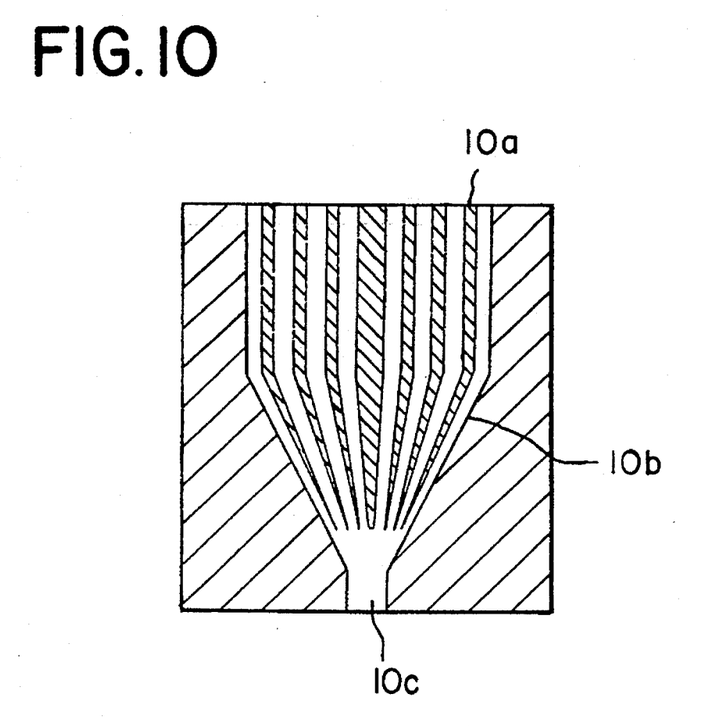
FIG. 10 is a vertically sectional view of the extrusion die shown in FIG. 9 along its central line.

In utilizing the straightening plates in FIGS. 6 and 7 in place of those in FIGS. 5 and 6, a similar effect can be obtained. An example in which the number of these straightening plates are increased is shown in FIGS. 9 and 10.

The constitution of the internal structure depends upon kinds of filler and binder to be used, a space between the straightening plates, the viscosity of the kneaded material at the time of its passage through the straightening plates, shear stress and shear rate. Therefore, in order to obtain a desired structure, extrusion conditions can be optionally set. Furthermore, in order to form two or more concentric tubular layer structures in the internal structure as shown in FIG. 3, the number of the concentric conical tubular straightening plates is increased as shown in FIGS. 9 and 10 (FIG. 9 is a cross-sectional view, and FIG. 10 is a side view).

In a pencil lead disclosed in Japanese Patent Application Laid-open No. 139274/1992 in which a filler is radially oriented from the central portion to the peripheral portion of the lead, there is the drawback that cracks are liable to occur along the parallel arrangement of the filler owing to shrinkage stress extending from the outer periphery to the central portion of the lead caused in a heat treatment step. However, the pencil lead shown in FIGS. 2 and 3 has no problem of the cracks in spite of having the radial orientation of the filler in a part of the cross-sectional structure. This reason is considered to be that the shrinkage stress in the heat treatment step is suitably relieved by one or more layers in which the filler is oriented in the concentric tubular form in the internal structure of the lead.

In the present invention, the thus extruded linear articles are baked at a temperature of from 900° to 1,200° C., and the baked articles are immersed in an oil or a fat to impregnate pores in the baked materials with the oil or the fat, whereby the pencil leads of the present invention can be obtained.

Examples of the filler which can be used in the present invention include natural graphite, artificial graphite, Kish graphite, carbon black, coke powder, mica, talc and boron nitride, and they can be used singly or in combination. The average particle diameter of the filler is 50 μm or less, preferably 1–10 μm. If the average particle diameter of the filler is more than 50 μm, strength cannot be exerted. Conversely, if it is less than 1 μm, the orientation of the filler is poor and the strength cannot be given, and hardness is only increased unpreferably.

Examples of the binder which can be used in the present invention include clay minerals such as kaolinite, halloysite, montmorillonite and bentonite, thermoplastic resins such as vinyl chloride resin, chlorinated vinyl chloride resin and polyvinyl alcohol, thermosetting resins such as furan resin, phenolic resin and epoxy resin, natural polymers such as lignin, cellulose and tragacanth gum, and pitches such as petroleum asphalt, coal tar pitch, pitch formed at the decomposition of a naphtha, and pitch formed at the dry distillation of a synthetic resin. They can be used singly or in combination.

For the purpose of improving characteristics in the kneading step which is achieved by adding high shearing force and/or characteristics in the extrusion step, various additives may be used, if necessary. Examples of these additives include an plasticizer and/or a solvent such as water, DOP, DBP, TCP, DOA, DAP, propylene carbonate, an alcohol, a ketone, and an ester. They may be used singly or in combination.

In the lead baked at a high temperature of from 900° to 1,200° C., pores formed by the decomposition of the binder, the plasticizer and the like are originally present, and in the usual pencil leads, these pores are impregnated with an oil or a fat. The writing performance of the pencil leads depends finely upon not only the smoothness of graphite but also the pores present in the pencil leads.

A pore generating material is a material for mainly forming pores which is blended and dispersed in order to artificially regulate a porosity and a pore distribution in addition to the pores formed by the decomposition of the binder and the plasticizer.

Examples of the pore generating material include sublimable organic compounds such as anthraquinone, fumaric acid and isophthalic acid. In a certain method, the pore generating material which is added to the material is sublimated in a baking step. In addition, another method can be utilized in which a depolymerizable polymer such as polyethylene, polypropylene or polytetrafluoroethylene which is added to the material is depolymerized in the baking step to evaporate the same in the form of monomers or low-molecular substances, thereby forming the fine pores.

As will be apparent from the results of the undermentioned examples, in pencil leads of the present invention having the concentric tubular orientation of a filler in the outer peripheral portion of its cross-sectional structure and having one or more concentric tubular orientation layers of the filler in the internal portion of the cross-sectional structure, strength can be remarkably improved without lowering density, and balance between the strength and the density is extremely excellent.

EXAMPLES

Next, the present invention will be described in more detail in reference to examples, but the scope of the present invention should not be limited to these examples.

Example 1

| Graphite (natural flaky graphite) | 50 pts. wt. |
| Polyvinyl chloride | 50 pts. wt. |
| Stearate | 1 pt. wt. |
| Dioctyl phthalate (DOP) | 20 pts. wt. |

The above-mentioned materials were mixed and dispersed by a Henschel mixer, and then kneaded by a pressing kneader and a twin roll. Afterward, the kneaded material was extruded through an extrusion die equipped with concentric conical tubular straightening plates shown in FIGS. 5 and 6. In order to remove the remaining plasticizer, the extruded articles were then subjected to a heat treatment at 180° C. for 10 hours in air to be solidified. Next, they were heated up to 300° C. at 10° C./hr, and from 300° up to 1,000° C. at 30° C./hr, and then baked at 1,000° C. for 1 hour in a nitrogen atmosphere. In the last place, they were immersed into alpha olefin oligomer (trade name Lipoloob 20, made by The Lion Co., Ltd.) to impregnate them with the oil, whereby leads having a diameter of 0.570 mm for mechanical pencils were obtained.

In the cross-sectional structure of the thus obtained lead, as shown in FIG. 2, graphite of the filler was oriented in a concentric circular form in its outer peripheral portion, and also in the internal portion of the cross-sectional structure, the filler was similarly oriented in the concentric circular form. This internal filler orientation was spaced in a radial direction from the outer peripheral portion. In the other portions in the cross-sectional structure, the filler was radially oriented. Furthermore, any cracks did not take place in the baking step.

Example 2

Leads having a diameter of 0.570 mm for mechanical pencils were obtained by the use of the same materials and the same steps in Example 1 except that a die for extrusion equipped with concentric conical tubular straightening plates shown in FIGS. 9 and 10 was used.

In the cross-sectional structure of the thus obtained lead, as shown in FIG. 3, graphite of the filler was oriented in a concentric circular form in its outer peripheral portion, and also in the internal portion of the cross-sectional structure, there were two layers in which the filler was similarly oriented in the concentric circular form. In the other portions in the cross-sectional structure, the filler was radially oriented. Furthermore, any cracks did not take place in the baking step.

Example 3

| Natural flaky graphite | 70 pts. wt. |
| Montmorillonite clay | 15 pts. wt. |
| Halloysite | 15 pts. wt. |
| Water | 30 pts. wt. |

Figure 8:
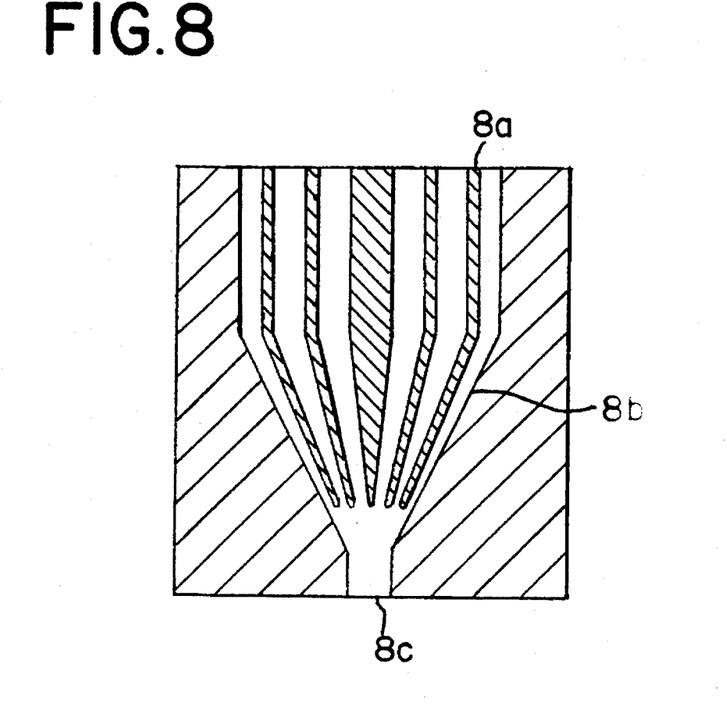
FIG. 8 is a vertically sectional view of the extrusion die shown in FIG. 7 along its central line.

The above-mentioned materials were mixed and dispersed by a Henschel mixer, and then sufficiently heated and kneaded by a twin roll until a water content came to about 18 parts. Afterward, the kneaded material was extruded into a linear form through an extrusion die equipped with concentric conical tubular straightening plates shown in FIGS. 7 and 8. The extruded articles were then subjected to a heat treatment at 120° C. for 20 hours in air to remove the remaining water. Next, they were heated up to 1,200° C. in 10 hours, and then baked at 1,200° C. 1 hour in a nitrogen atmosphere. In the last place, they were immersed into an animal oil to impregnate them with the oil, whereby wood-cased leads having a diameter of 2.05 mm were obtained.

In the cross-sectional structure of the thus obtained pencil lead, as shown in FIG. 1, graphite of the filler was oriented in a concentric circular form in its outer peripheral portion, and in the internal portion of the cross-sectional structure, there was one layer in which the filler was similarly oriented in the concentric circular form. In the other portions in the cross-sectional structure, the filler was oriented at random as a cluster of bees in a beehive. Furthermore, any cracks did not take place in the baking step.

Comparative Example 1

Figure 11:
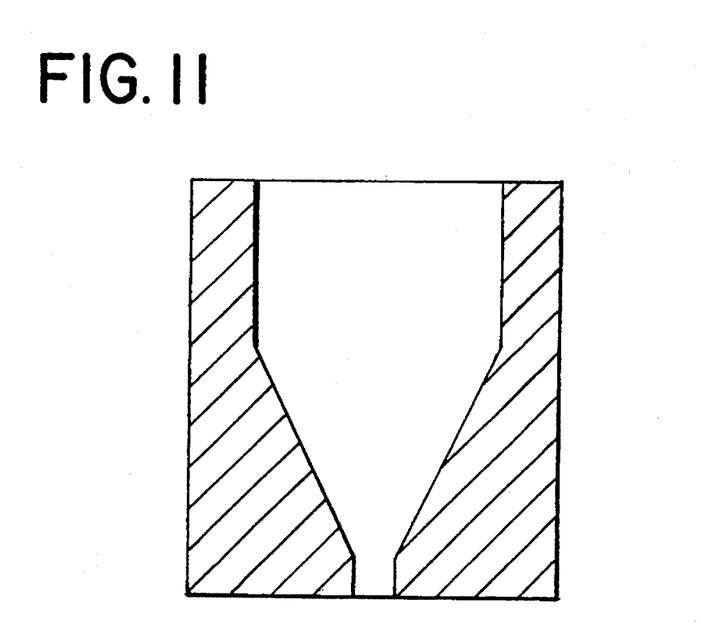
FIG. 11 is a vertically sectional view of a conventional extrusion die for pencil leads along its central line.

Leads having a diameter of 0.570 mm for mechanical pencils were obtained by the use of the same materials and the same steps in Example 1 except that extrusion was carried out by employing an extrusion die shown in FIG. 11.

The cross-sectional structure of the thus obtained lead had a conventional structure, as shown in FIG. 4.

Comparative Example 2

Wood-cased leads having a diameter of 2.05 mm were obtained by the use of the same materials and the same steps in Example 3 except that extrusion was carried out by employing an extrusion die shown in FIG. 11.

The cross-sectional structure of the thus obtained lead had a conventional structure, as shown in FIG. 4.

For the leads prepared in Examples 1, 2 and 3 and Comparative Examples 1 and 2, bending strength (MPa), density (D) and hardness were measured in accordance with JIS S6005. The obtained results are set forth in Table 1.

TABLE 1

|  | Bending Strength (MPa) | Density (D) | Hardness |
| --- | --- | --- | --- |
| Example 1 | 400 | 0.32 | about HB |
| Example 2 | 430 | 0.31 | about HB |
| Comp. Ex. 1 | 350 | 0.32 | about HB |
| Example 3 | 160 | 0.32 | about HB |
| Comp. Ex. 2 | 120 | 0.32 | about HB |

What is claimed is:

1. A method for preparing baked pencil leads which comprises the steps of blending a filler and a binder as the main materials with pore generating materials, kneading them, extruding the kneaded material, and then subjecting the extruded articles to a heat treatment at a high temperature, wherein a plurality of concentric conical tubular straightening plates having the sectional area of a flow path continuously decreased toward a nozzle orifice are provided on the upstream side of an extrusion nozzle, and the extrusion is carried out through the straightening plates and the extrusion nozzle.

2. The method for preparing baked pencil leads according to claim 1 wherein the filler is at least one selected from the group consisting of natural graphite, artificial graphite, Kish graphite, carbon black, coke powder, mica, talc and boron nitride.

3. The method for preparing baked pencil leads according to claim 1 wherein the average particle diameter of the filler is in the range of from 1 µm to 50 µm.

4. The method for preparing baked pencil leads according to claim 1 wherein the binder is at least one selected from the group consisting of kaolinite, halloysite, montmorillonite, bentonite, vinyl chloride resin, chlorinated vinyl chloride resin, polyvinyl alcohol, furan resin, phenolic resin, epoxy resin, lignin, cellulose, tragacanth gum, petroleum asphalt, coal tar pitch, pitch formed at the decomposition of a naphtha, and pitch formed at the dry distillation of a synthetic resin.

* * * * *